United States Patent
Rouquette et al.

(10) Patent No.: US 7,899,585 B2
(45) Date of Patent: Mar. 1, 2011

(54) DEVICE FOR MONITORING AIRCRAFT CONTROL INFORMATION

(75) Inventors: Patrice Rouquette, Pompertuzat (FR); Jean-Philippe Huynh, Tournefeuille (FR)

(73) Assignee: Airbus France, Toulouse (FR)

( * ) Notice: Subject to any disclaimer, the term of this patent is extended or adjusted under 35 U.S.C. 154(b) by 938 days.

(21) Appl. No.: 11/758,325

(22) Filed: Jun. 5, 2007

(65) Prior Publication Data

US 2007/0299568 A1 Dec. 27, 2007

(30) Foreign Application Priority Data

Jun. 6, 2006 (FR) .................................. 06 04985

(51) Int. Cl.
*G01S 5/00* (2006.01)
*G06F 19/00* (2006.01)

(52) U.S. Cl. ............................... 701/9; 701/4; 340/963; 244/183

(58) Field of Classification Search ............... 701/9, 701/4, 35, 29, 33; 340/963; 244/183
See application file for complete search history.

(56) References Cited

U.S. PATENT DOCUMENTS

| | | | |
|---|---|---|---|
| 3,665,173 A | 5/1972 | Bouricius et al. | |
| 4,594,714 A | 6/1986 | Fischer et al. | |
| 6,059,225 A | 5/2000 | Vidal et al. | |
| 6,377,892 B1 * | 4/2002 | Johnson et al. | 701/213 |
| 7,447,590 B2 * | 11/2008 | Arethens | 701/216 |
| 7,690,603 B2 * | 4/2010 | Peyrucain et al. | 244/183 |
| 2001/0052562 A1 * | 12/2001 | Ishihara et al. | 244/175 |
| 2006/0167619 A1 * | 7/2006 | Arethens | 701/120 |
| 2006/0287809 A1 | 12/2006 | Lebrum | |

FOREIGN PATENT DOCUMENTS

| | | |
|---|---|---|
| EP | 0 870675 | 10/1998 |
| FR | 2855922 | 12/2004 |
| GB | 2140173 | 11/1984 |

* cited by examiner

*Primary Examiner*—Tan Q Nguyen
(74) *Attorney, Agent, or Firm*—Dickinson Wright PLLC

(57) ABSTRACT

A device includes a computer for computing the difference between at least two items of control information that are generated by at least two different flight management systems of an aircraft, and a system for generating a warning signal if the difference is greater than a threshold value.

8 Claims, 2 Drawing Sheets

DEVICE FOR MONITORING AIRCRAFT CONTROL INFORMATION

The present invention relates to a device for monitoring aircraft control information, in particular of a transport aircraft.

TECHNICAL FIELD OF THE INVENTION

Said control information relates to information such as, for example, the controlled speed or the controlled roll, that is usually determined by at least one Flight Management System (FMS) and that is used in particular to guide the aircraft.

BACKGROUND OF THE INVENTION

In the context of future air operations such as high level navigation performance operations on the approach and on take-off, of the RNP SAAAR ("Required Navigation Performance with Special Aircraft and Aircrew Approval Required") type or of the RNP AR ("Required Navigation Performance with Authorizations Required") type, one of the problems to be solved is to make ever more secure the RNP type control system, in particular the guidance system.

Operations of the RNP type are operations carried out essentially with the aid of positioning sensors, particularly of the GPS ("Global Positioning System") type, flight management computers of the FMS type and an automatic pilot means onboard the aircraft. Most flight management systems generate control instructions for guidance in the form of a roll command. This roll command is transmitted to the automatic pilot means whose task is to apply it. Such an embodiment is in particular provided on civil transport aircraft of the Airbus A320, A330, A340, and A380 type. The flight management systems are noncritical.

On civil transport aircraft there is no specific monitoring concerning the roll command originating from a flight management system. The flight management system is currently the largest contributor in the computation of failures of the "undetected loss of guidance" type. Furthermore, there is no specific monitoring linked to the small guidance loop input roll command. The guidance computer is therefore another significant contributor in the computation of failures of the "undetected guidance loss" type.

One of the problems posed by the aforementioned operations of the RNP SAAAR type is that they are based on the use of at least one flight management system. Currently, the operations of the RNP SAAAR type are similar to nonprecision approach operations and are therefore compatible with the use of a flight management system. However, a feature of operations of the RNP SAAAR type is that the aircraft must be guided along a precise flight path in space (referenced in the flight management system) to avoid potential obstacles (mountains, etc.) relatively closer than is currently achieved.

Also, even though, from a current regulatory point of view, the specific stability requirement is satisfied with the aforementioned usual architectures, it would be advantageous to be able to have an architecture that is significantly more robust against guidance failures, in the context of operations of the RNP SAAAR type. The future regulations could be based on such a more robust architecture.

SUMMARY OF THE INVENTION

The object of the present invention is in particular to enhance the reliability of aircraft guidance, without having to profoundly change the computers that currently exist. It relates to a device for monitoring aircraft control information (that is generated by at least two different flight management systems onboard the aircraft), making it possible to remedy the aforementioned disadvantages.

For this purpose, according to the invention, said onboard device is noteworthy in that it comprises:
- at least one computer external to said flight management systems and comprising a comparison means that includes a first element for computing the differences, in twos, between control information originating from each of said flight management systems and a second element for comparing each of these differences with at least one predetermined threshold value; and
- a warning system that is connected to said computer and that generates a warning signal when at least one of said differences is greater than said threshold value.

Therefore, the monitoring device according to the invention monitors the control information (controlled roll or controlled speed for example) originating from at least two flight management systems so as to be able to detect any inconsistency, and in particular to be able to take account thereof in the guidance of the aircraft, by means of said warning system, as specified below.

The device according to the invention applies to all flight phases where at least two flight management systems of the aircraft are active and manage the flight by supplying control information, in particular guidance information. Said device finds its most worthwhile application in (nonprecision) approach and takeoff operations with the aid of flight management systems, in particular in a context of an aforementioned RNP SAAAR-type approach.

Therefore, thanks to the invention, an external computer that is considered reliable uses the control information, in particular guidance information, supplied by the various flight management systems of the aircraft, and the warning system generates a warning signal as specified below when these items of control information differ (from one another) by more than a predetermined threshold value.

It will be noted that the present invention applies to an aircraft furnished with at least two different flight management systems, and in particular to a civil transport aircraft of the A320, A330 or A340 type (that comprises two flight management systems) or to a civil transport aircraft of the A380 type that comprises three flight management systems.

In the context of the present invention, said warning system may comprise different means specified below.

In a first embodiment, said warning system comprises a means making it possible to generate a warning signal capable of rendering passive a guidance function of an automatic pilot means, in particular by causing said automatic pilot means to revert to basic mode or by disconnecting this automatic pilot means. In this case, the attention of the pilot is drawn very early to the potentially faulty behavior of the flight management systems so that he can then make decisions such as taking control of the aircraft or disabling the warning for example, after having appraised himself of the situation.

In a second embodiment, as a variant of or as a supplement to the first aforementioned embodiment, said warning system comprises a display screen that displays a warning message, of the text or analog type, illustrating said warning signal.

In addition, in a third embodiment, as a variant of or as a supplement to one of said first and second aforementioned embodiments, said warning system comprises a primary flight display (PFD) that generates a warning signal in the form of a change of bars relative to a flight director system that are displayed on this primary flight display. In this case, in a preferred application, said primary flight display is formed so as also to display (in addition to said bars relative to said flight director system corresponding to the side of the aircraft on which this primary flight display is located) information relating to the flight director system corresponding to the opposite side.

Furthermore in a fourth embodiment, said warning system comprises at least one alarm means (of the visual or audible type).

Thanks to said second, third or fourth embodiment, the attention of the pilot is drawn very early to a potentially faulty behavior of the flight management systems so that he can then make decisions such as taking control of the aircraft, transferring authority from an automatic pilot means or disabling the warning for example, after having appraised himself of the situation.

Furthermore, in a particular embodiment:
said device also comprises:
first means for generating at least two different current values of at least one flight parameter (for example the lateral difference between the current position of the aircraft and a reference path that said aircraft should follow), originating from different sources; and
second means for verifying the consistency between said current values; and
said warning system is formed so as to take account of the processes applied by said second means for generating said warning signal.

The present invention also relates to an aircraft guidance system of the type comprising:
an assembly of sources of information;
a flight management assembly that is connected to said assembly of sources of information and that includes at least two flight management systems capable of generating control information; and
an automatic pilot means using data obtained from said control information in order to automatically guide the aircraft.

According to the invention, said guidance system is noteworthy in that it also comprises a device for monitoring control information as specified above.

The figures of the appended drawing will explain how the invention can be embodied. In these figures, identical reference numbers indicate similar elements.

FIG. 1 is the block diagram of a monitoring device according to the invention.

FIG. 2 shows schematically a guidance system to which a monitoring device according to the invention is applied.

FIG. 3 shows schematically a particular embodiment of a warning system forming part of a monitoring device according to the invention.

BRIEF DESCRIPTION OF THE DRAWINGS

The device 1 according to the invention and shown schematically in FIG. 1 is designed to monitor aircraft control information, in particular guidance control information, such as controlled speeds or controlled rolls for example, and to do so irrespective of the flight phase of the aircraft.

In the context of the present invention, this control information is generated by at least two different flight management systems 2A and 2B, that form part of an onboard flight management assembly 3 as shown in FIG. 2.

Figure 1:
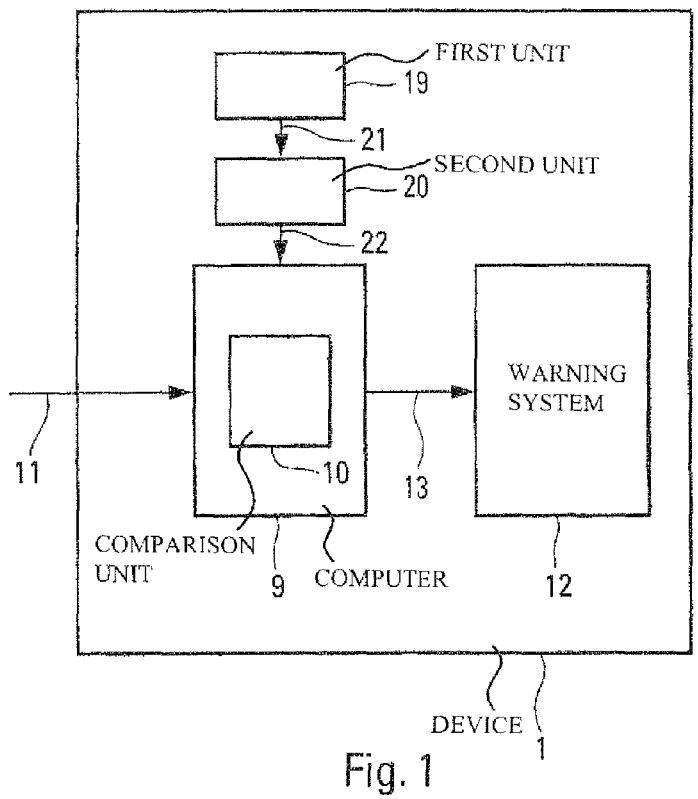
Figure 2:
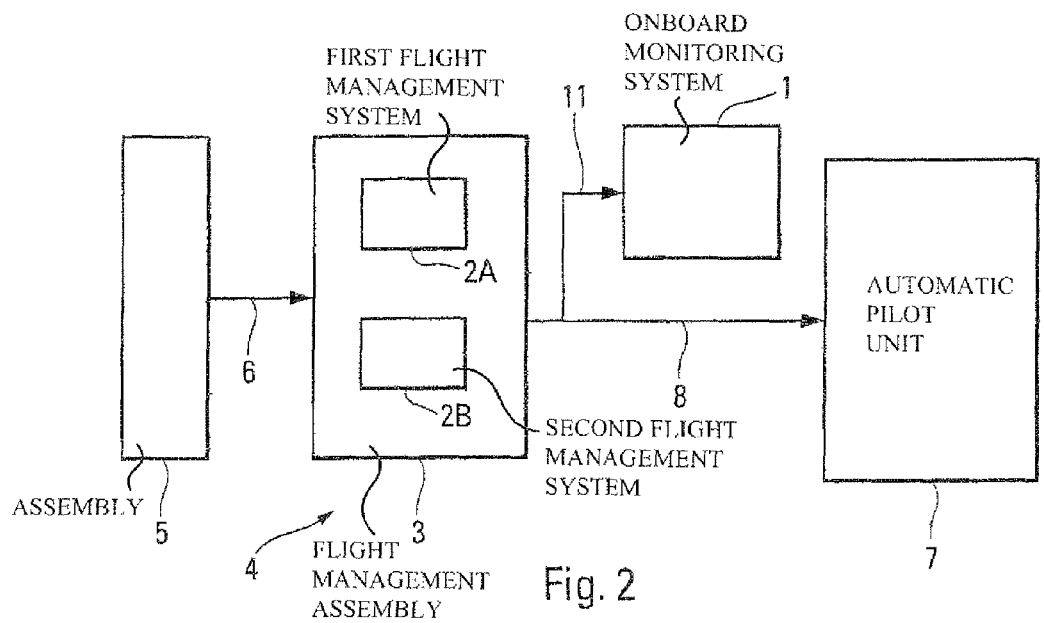

Usually, such a flight management assembly 3 may form part of an aircraft guidance system 4 that also comprises:
an assembly 5 of usual sources of information that is connected via a link 6 to said assembly 3; and
a usual automatic pilot means 7 that is connected via a link 8 to said flight management assembly 3 and that uses, to automatically guide the aircraft, particularly data that are usually obtained from control information generated by said flight management systems 2A and 2B.

According to the invention, said onboard monitoring system 1 comprises:
at least one computer 9 that is external to said flight management systems 2A, 2B that is reliable and that comprises a comparison means 10. This comparison means 10 comprises a first integrated element that computes the differences, in twos, between control information received respectively from said flight management systems 2A, 22 via a link 11 (that is for example connected to said link 8 at the output of said assembly 3). This comparison means 10 also comprises a second integrated element that compares each of the differences thus computed with at least one predetermined threshold value. This second element may comprise a hysteresis to prevent the results of the comparison from constantly varying; and
a warning system 12 that is connected via a link 13 to said computer 9 and that is formed so as to generate a warning signal specified below, when said second element concludes that at least one of said differences is greater than said threshold value.

DETAILED DESCRIPTION OF THE INVENTION

Therefore, the monitoring device 1 according to the invention monitors control information (controlled roll or controlled speed for example) originating from at least two different flight management systems 2A, 2B of the aircraft so as to be able to detect any inconsistency, and in particular to be able to take account thereof in the guidance of said aircraft, by means of said warning system 12, as specified below.

The device 1 according to the invention applies to all the flight phases in which at least two flight management systems 2A, 23 of the aircraft are active and are managing the flight by supplying control information, in particular guidance instructions. Said device 1 finds its most worthwhile application in (nonprecision) approach and takeoff operations with the aid of flight management systems, in particular in the context of an approach of the aforementioned RNP SAAAR type.

Therefore, according to the invention, an external computer 9 that is considered reliable uses the control information, in particular guidance information, supplied by the various flight management systems 2A, 2B of the aircraft, and the warning system 12 generates a warning signal as specified below when these items of control information differ (from one another) by more than a predetermined threshold value. Said computer 9 may be, in particular, a flight warning computer (FWC), a display management computer (DMC) or a flight guidance computer (FGC).

It will be noted that the present invention applies to an aircraft furnished with at least two different flight management systems 2A, 2B, and in particular to a civil transport aircraft of the A320, A330 or A340 type (each of which comprises two flight management systems) or to a civil transport aircraft of the A380 type that comprises three flight management systems. Naturally, in the case of two flight management systems 2A and 23, said first element of the comparison means 10 computes only one difference on each occasion, that is to say the difference between the items of information received respectively from said two systems 2A and 2B, while in the case of three flight management systems 2A, 2B and 2C, said first means computes three differences on each occasion, namely those between the items of control information from 2A and 2B, from 2A and 2C and from 2B and 2C.

In the context of the present invention, said warning system 12 may comprise different means specified below.

Figure 3:
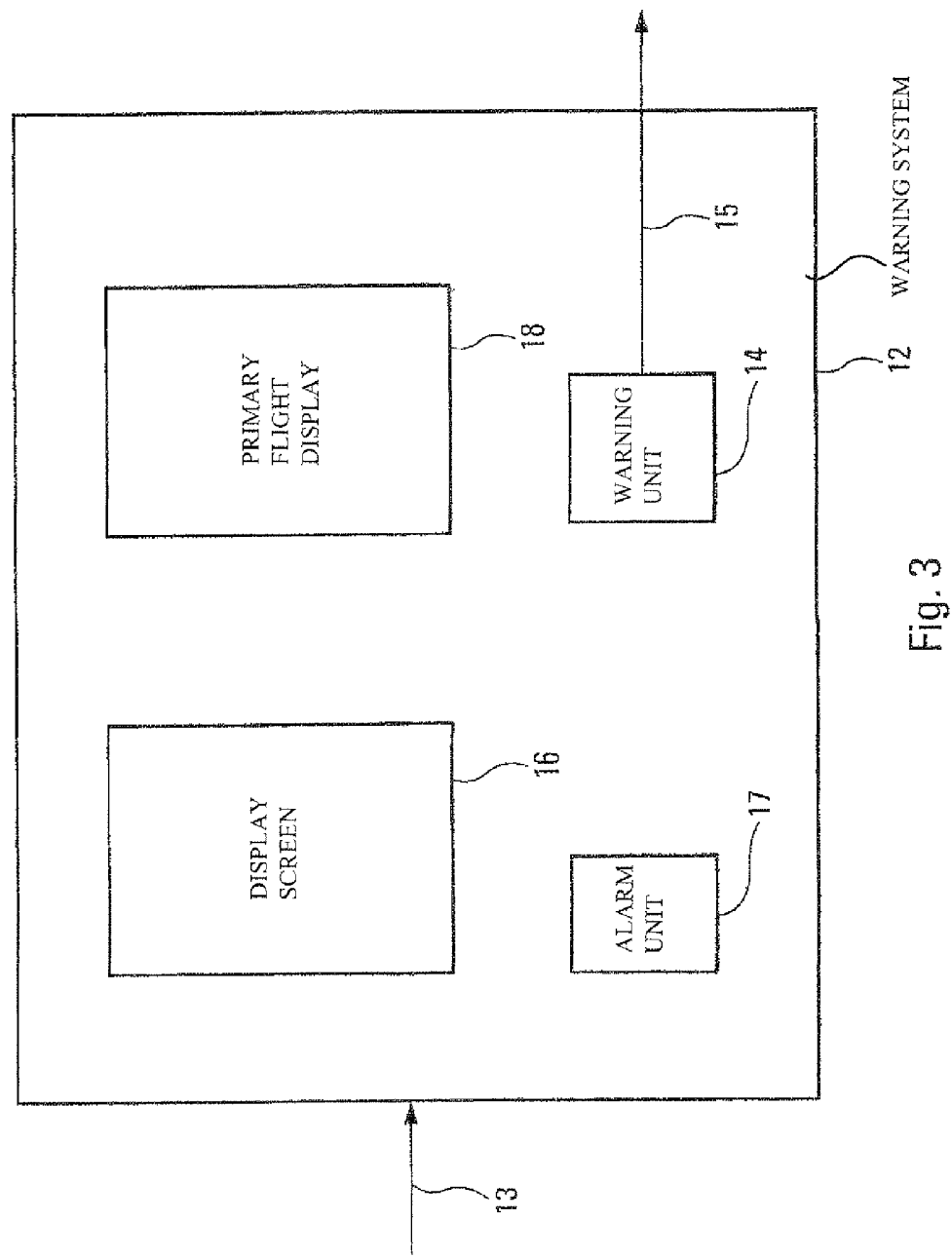

Said warning system 12 may in particular comprise, as shown in FIG. 3, a means 14 making it possible to generate a warning signal capable of rendering passive a guidance function of said automatic pilot means 7, to which it is for example connected by means of a link 15. Accordingly, said means 14 may cause the automatic pilot means 7 to revert to a basic mode (of the usual "heading/vertical speed" or "track/FPA" type) according to a cockpit reversion in which case it can disconnect said automatic pilot means 7 based on a cockpit autopilot disconnection.

Said warning system 12 may also comprise a display screen 16, for example a primary flight display (PFD), a navigation display (ND), an engine warning display (EWD) or a multipurpose control and display unit (MCDU). This display screen 16 is designed to display a warning message, in text form or in analog form, intended to illustrate said warning signal as appropriate.

In addition, said warning system 12 may also comprise a (triggerable) alarm means 17, for example a dedicated indicator lamp and/or an audible alarm, that is provided in the cockpit of the aircraft and that is triggered when a warning signal is emitted.

Furthermore, said warning system 12 may also comprise a primary flight display 18 (PFD) that generates a warning signal in the form of a change in the DV bars relative to a flight director system (that is usually displayed on this primary flight display 18), for example by causing these DV bars to blink.

In a particular embodiment, each primary flight display 18 of the aircraft that usually has two, one being intended for the pilot and the other for the copilot, may display, in addition to the usual DV bars, also at least one particular symbol materializing at least one item of information relative to the display 18 of the opposite side. This item of information may be used by the pilot as a supplementary item of information, in addition to the other items of information already available on the primary flight display and a navigation display, in the diagnosis for the purpose of identifying the source of a failure, in order to isolate it (confirmation that the flight director screen on the opposite side is trustworthy), and in the manual control of the aircraft during a reversion to manual control phase.

It is known that, in the most usual case of an embarkation failure, the flight director system DV bars indicate very different settings on both sides of the cockpit, although each operator (pilot, copilot) has only one item of information on his side. Also, the pilot, in the usual situation, has to rapidly exchange information with the copilot, and may decide to delete the DV bars and manage the situation by other means. To remedy these disadvantages:

said device also comprises:
  means 19 for generating at least two different current values originating from two different sources of at least one and the same flight parameter (such as the current lateral difference between the current position of the aircraft and a reference path for example). These means 19 may form part of an assembly 5; and
  means 20 that are connected via links 21 and 22 respectively to said means 19 and to said computer 9 and that are formed so as to verify the consistency of said two values generated by said means 19; and
said warning system 12 is formed so as to take account of said current values to generate said warning signal and to display a supplementary item of information concerning a decision-making aid.

The warning system 12 transmits to the pilot a different warning signal when each of these analyzed items of information (control information, lateral difference) is no longer trustworthy, for example in the form of blinking signals and/or by the automatic removal of indicators, so as to more precisely attract the attention of the crew to the inconsistencies that then exist.

Therefore, the pilot can continue to display the DV bars and he can improve the diagnosis relative to identifying the source of the failure, and the manual control of the aircraft during a reversion to manual control.

The invention claimed is:

1. A device for monitoring aircraft control information, the control information generated by at least two different flight management systems onboard an aircraft, comprising:
  at least one computer external to said flight management systems and comprising a comparison unit that includes a first element for computing the differences, in twos, between control information originating from each of said flight management systems and a second element for comparing each of the differences with at least one predetermined threshold value; and
  a warning system connected to said computer that generates a warning signal when at least one of said differences is greater than said threshold value, and that comprises at least one primary flight display generating a warning signal in the form of a change of bars relative to a flight director system, that are displayed on the primary flight display.

2. The device as claimed in claim 1, wherein said warning system further comprises a warning unit to generate a warning signal to render passive a guidance function of an automatic pilot unit.

3. The device as claimed in claim 1, wherein said warning system further comprises a display screen that displays a warning message illustrating said warning signal.

4. The device as claimed in claim 1, wherein said warning system further comprises at least one warning means.

5. The device as claimed in claim 1, wherein said primary flight display is formed to display, in addition to said bars relative to the flight director system corresponding to a side of the aircraft where said primary flight display is located, information relating to the flight director system corresponding to an opposite side.

6. The device as claimed in claim 1, said device further comprises:
  a first unit for generating at least two different current values of at least one flight parameter, originating from different sources; and
  a second unit for verifying consistency between said current values, wherein
  said warning system is formed to take account of processes applied by said second unit.

7. An aircraft guidance system, comprising:
  an assembly of sources of information;
  a flight management assembly connected to said assembly of sources of information and that includes at least two flight management systems configured for generating control information; and
  an automatic pilot unit using data obtained from said control information to automatically guide the aircraft, which comprises a device for monitoring control information, as specified in claim 1.

8. An aircraft comprising a guidance system as specified in claim 7.

* * * * *